J. Turner,
Sharpening Plane Irons.

Nº 28,946.          Patented June 26, 1860.

Witnesses:
R. Hlady
F. P. Hale Jr.

Inventor;
Joshua Turner

UNITED STATES PATENT OFFICE.

J. TURNER, OF CAMBRIDGEPORT, MASSACHUSETTS, ASSIGNOR TO HIMSELF, AND F. GUILD, OF DEDHAM, MASSACHUSETTS.

PLANE-IRON SHARPENER.

Specification of Letters Patent No. 28,946, dated June 26, 1860.

*To all whom it may concern:*

Be it known that I, JOSHUA TURNER, of Cambridgeport, in the county of Middlesex and State of Massachusetts, have invented a new and useful Machine for Sharpening a Joiner's Plane-Iron or other Tool of Like Nature; and I do hereby declare the same to be fully described and represented in the following specification and the accompanying drawings, of which—

Figure 1:
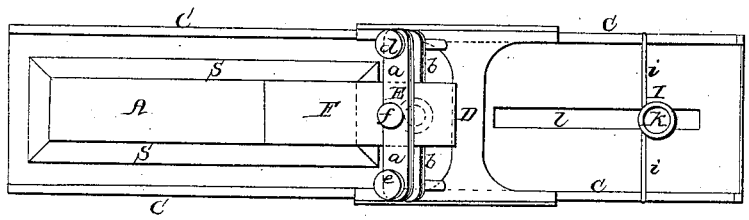
Figure 2:
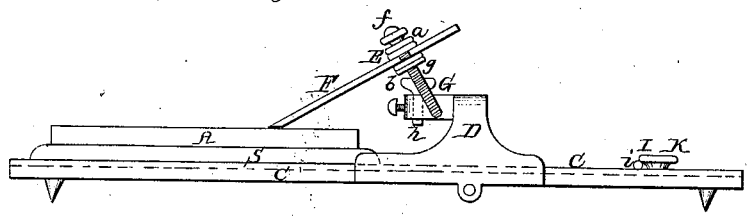
Figure 3:
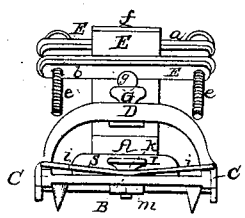

Figure 1, is a top view; Fig. 2, a side elevation; Fig. 3, a rear end view, and Fig. 4, a longitudinal and central section of it.

My said machine will answer for sharpening gouges and various other tools used by turners, joiners or other artificers.

In the drawings, A exhibits a whetstone as supported by a stand or table, B, or has a wooden socket piece S, resting in or on the table. This table is furnished with two parallel rails or ways C, C, or the equivalent thereof, for supporting and guiding an arched carriage, D, which is placed thereon, as represented. Over and sustained by such carriage, D, there is a separate tool carrier or holder, E, consisting of two bars $a$, $b$, and two clamp screws, $d$, $e$. Each screw passes through the upper bar $d$, and screws into the lower one so that when a plane iron F, is arranged between the two bars as shown, it may be clamped to them by the screws. Each bar of the carrier has a spherical projection or ball, $f$, or, $g$, extended from it as shown in the drawings. When the carrier is applied to the carriage D, one of these balls $f$, $g$, is to rest in an adjustable cup, socket or step G, which is provided with a screw, $h$, to screw vertically into the carriage. By means of the screw, the bevel of the edge of the plane iron may be varied within certain limits.

Figure 4:
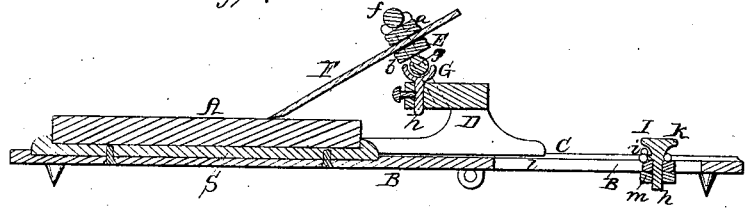

In rear of the carriage and the stone holder S, of the table B, there is an adjustable stop, I, which consists of a bar, $i$, projecting across the two rails, C, C, and held to the table by a clamp screw, $k$, which extends through a long slot, $l$, (made in the table) and screws into a piece of metal, $m$, extending across the slot and arranged underneath the table as shown in Fig. 4. The said slot serves to arrest the rearward movement of the carriage so that the plane-iron while being moved backward on the whetstone may not slip off the rear end of it.

In the operation of this machine, a person after having fixed a plane iron in the holder, E, and so as to rest at the bevel of its cutting edge on the stone, bears his hands on the holder, the iron and the carriage and moves the whole backward and forward longitudinally so as to cause the iron to be sharpened by the upper surface of the stone. While this is being done the spherical projection, that may be in the cup or socket of the carriage, will enable the plane iron to conform to the stone so as to wear equally while being moved on it.

By means of the two spherical projections applied to the cutter carrier or extended from it as described and represented we are able quickly to reverse the plane iron or turn it over so as to bring its opposite face in contact with the stone. This will be found particularly useful in removing a "wire edge" from the iron or for sharpening irons or tools which have two bevels to their cutting edge. Furthermore, the spherical projection enables a gouge to be turned laterally while being sharpened.

The machine constructed in manner and to operate as described is very useful to joiners or others for rapid and accurate sharpening of their plane irons or various other cutting tools.

I claim—

1. The combination and arrangement of the separate cutter carrier and its carriage with the whetstone supporter provided with parallel ways or equivalent means of guiding the carriage, the whole being to operate together substantially as and for the purpose specified.

2. The arrangement of ball bearings on opposite sides of the cutter carrier and to operate with a socket of the carriage as specified.

3. Making the socket or step adjustable vertically for the purpose explained.

4. The combination and arrangement of an adjustable stop with the table, the cutter carrier and its carriage applied to the table and with reference to the whetstone or its supporter as specified.

JOSHUA TURNER.

Witnesses:
R. H. EDDY,
F. P. HALE, Jr.